(12) United States Patent
Kahn et al.

(10) Patent No.: US 7,982,770 B1
(45) Date of Patent: Jul. 19, 2011

(54) METHOD AND APPARATUS TO PROVIDE IMPROVED IMAGE QUALITY IN A CAMERA

(75) Inventors: Philippe Kahn, Aptos, CA (US);
Arthur Kinsolving, Santa Cruz, CA (US); David Vogel, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 414 days.

(21) Appl. No.: 11/580,947

(22) Filed: Oct. 13, 2006

Related U.S. Application Data

(60) Provisional application No. 60/843,312, filed on Sep. 8, 2006.

(51) Int. Cl.
*H04N 5/228* (2006.01)

(52) U.S. Cl. .................................................. 348/208.1

(58) Field of Classification Search ............... 348/208.1, 348/208.2, 208.4, 208.7
See application file for complete search history.

(56) References Cited

U.S. PATENT DOCUMENTS

| | | | |
|---|---|---|---|
| 4,238,146 A | 12/1980 | Kitamura et al. | |
| 5,192,964 A | 3/1993 | Shinohara et al. | |
| 5,430,480 A | 7/1995 | Allen et al. | |
| 5,708,863 A | 1/1998 | Satoh et al. | |
| 5,717,611 A | 2/1998 | Terui et al. | |
| 5,790,490 A * | 8/1998 | Satoh et al. | 396/52 |
| 6,374,054 B1 | 4/2002 | Schinner | |
| 6,396,883 B2 | 5/2002 | Yang et al. | |
| 6,470,147 B1 | 10/2002 | Imada | |
| 6,628,898 B2 | 9/2003 | Endo | |
| 7,027,087 B2 * | 4/2006 | Nozaki et al. | 348/231.99 |
| 7,042,509 B2 * | 5/2006 | Onuki | 348/362 |
| 7,212,230 B2 | 5/2007 | Stavely | |
| 7,689,107 B2 | 3/2010 | Enomoto | |
| 7,705,884 B2 | 4/2010 | Pinto et al. | |
| 2002/0006284 A1 * | 1/2002 | Kim | 396/429 |
| 2002/0054214 A1 | 5/2002 | Yoshikawa | |
| 2002/0150302 A1 | 10/2002 | McCarthy et al. | |
| 2003/0151672 A1 * | 8/2003 | Robins et al. | 348/208.6 |
| 2004/0047498 A1 | 3/2004 | Mulet-Parada et al. | |
| 2004/0081441 A1 | 4/2004 | Sato et al. | |
| 2004/0106958 A1 | 6/2004 | Mathis et al. | |
| 2004/0130628 A1 * | 7/2004 | Stavely | 348/208.4 |
| 2004/0135898 A1 | 7/2004 | Zador | |
| 2004/0247030 A1 | 12/2004 | Wiethoff | |

(Continued)

FOREIGN PATENT DOCUMENTS

JP 7020547 A 1/1995

OTHER PUBLICATIONS

International Search Report and Written Opinion, PCT/US09/30223, mailed Feb. 23, 2009.

(Continued)

*Primary Examiner* — Sinh Tran
*Assistant Examiner* — Jason A Flohre
(74) *Attorney, Agent, or Firm* — Blakely, Sokoloff, Taylor & Zafman, LLP; Judith A. Szepesi

(57) ABSTRACT

A method and apparatus for providing improved images utilizing acceleration data is described. In one embodiment, the method utilizes the accelerometer data to time the taking of the image to minimize motion effects.

20 Claims, 7 Drawing Sheets

U.S. PATENT DOCUMENTS

| | | | |
|---|---|---|---|
| 2005/0078197 A1* | 4/2005 | Gonzalez | 348/231.99 |
| 2005/0157181 A1 | 7/2005 | Kawahara et al. | |
| 2005/0168587 A1 | 8/2005 | Sato et al. | |
| 2005/0203430 A1 | 9/2005 | Williams et al. | |
| 2005/0243178 A1 | 11/2005 | McConica | |
| 2006/0029284 A1 | 2/2006 | Stewart | |
| 2006/0257042 A1 | 11/2006 | Ofek et al. | |
| 2007/0263995 A1 | 11/2007 | Park et al. | |
| 2008/0030586 A1 | 2/2008 | Helbing et al. | |
| 2008/0231713 A1 | 9/2008 | Florea et al. | |
| 2008/0231714 A1 | 9/2008 | Estevez et al. | |
| 2009/0017880 A1 | 1/2009 | Moore et al. | |
| 2009/0067826 A1 | 3/2009 | Shinohara et al. | |
| 2009/0174782 A1 | 7/2009 | Kahn et al. | |

OTHER PUBLICATIONS

Ang, Wei Tech, et al, "Zero Phase Filtering for Active Compensation of Period Physiological Motion," Proc 1st IEEE / RAS-EMBS International Conference on Biomedical Robotics and Biomechatronics, Feb. 20-22, 2006, pp. 182-187.

Ricoh, "Advanced digital technology changes creativity," <http://www.ricoh.com/r_dc/gx/gx200/features2.html>, Accessed May 12, 2011, 4 pages.

Tech, Ang Wei, "Real-time Image Stabilizer," <http://www.mae.ntu.edu.sg/ABOUTMAE/DIVISIONS/RRC_BIOROBOTICS/Pages/rtimage.aspx>, Mar. 23, 2009, 3 pages.

* cited by examiner

1

METHOD AND APPARATUS TO PROVIDE IMPROVED IMAGE QUALITY IN A CAMERA

This patent application claims the benefit under 35 U.S.C. §119(e) of U.S. provisional application No. 60/843,312, filed on Sep. 8, 2006.

FIELD OF THE INVENTION

The present invention relates to improved image quality of pictures taken with a camera, and more particularly to using motion information to provide improved image quality.

BACKGROUND

One of the historical problems with photographs taken by small handheld cameras is hand motion. Most people do not hold their camera perfectly steady, and often the depression of the activator button itself is sufficient to cause a jiggle. An image taken when the camera is not stable will generally exhibit unwanted characteristics such as blurriness, fuzziness and streaks.

Methods of measuring the motion of an object, such as accelerometers, are becoming more common. Accelerometers are being integrated into cameras and video recorders to provide motion data. In particular, mobile telephones often include cameras. Due to their light weight and unusual form factor, such mobile phone cameras are particularly likely to have blurry pictures due to the user's motion.

One prior art method of using motion data to improve image quality includes providing a floating lens or similar apparatus to compensate for the motion. Alternative methods include gyroscopes or other systems providing counter-movement to balance any hand motions accidentally made by a user. However, both of these solutions require large hardware elements, and specialized cameras.

Another prior art method attempts to correct the image taken after the fact, based on the accelerometer data. However, this is computing intensive, and can be impossible if there is not sufficient data to correct for the problems caused by the motion.

SUMMARY OF THE INVENTION

An improved camera system including an accelerometer to detect motion, and stabilization logic to utilize the accelerometer data to select an image having a minimal motion, when a user provides an indication.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is a camera stabilization system which does not require additional corrective hardware or post-processing. In one embodiment, the system uses motion data, in one embodiment as detected by a three dimensional accelerometer, to take an image which has the minimal motion artifacts such as blurring, fuzziness, or streaks. Instead of counter balancing, the system takes one or more images, and selects an image having the minimum amount of motion. In one embodiment, the system starts taking images prior to the user clicking the shutter release.

Figure 1:
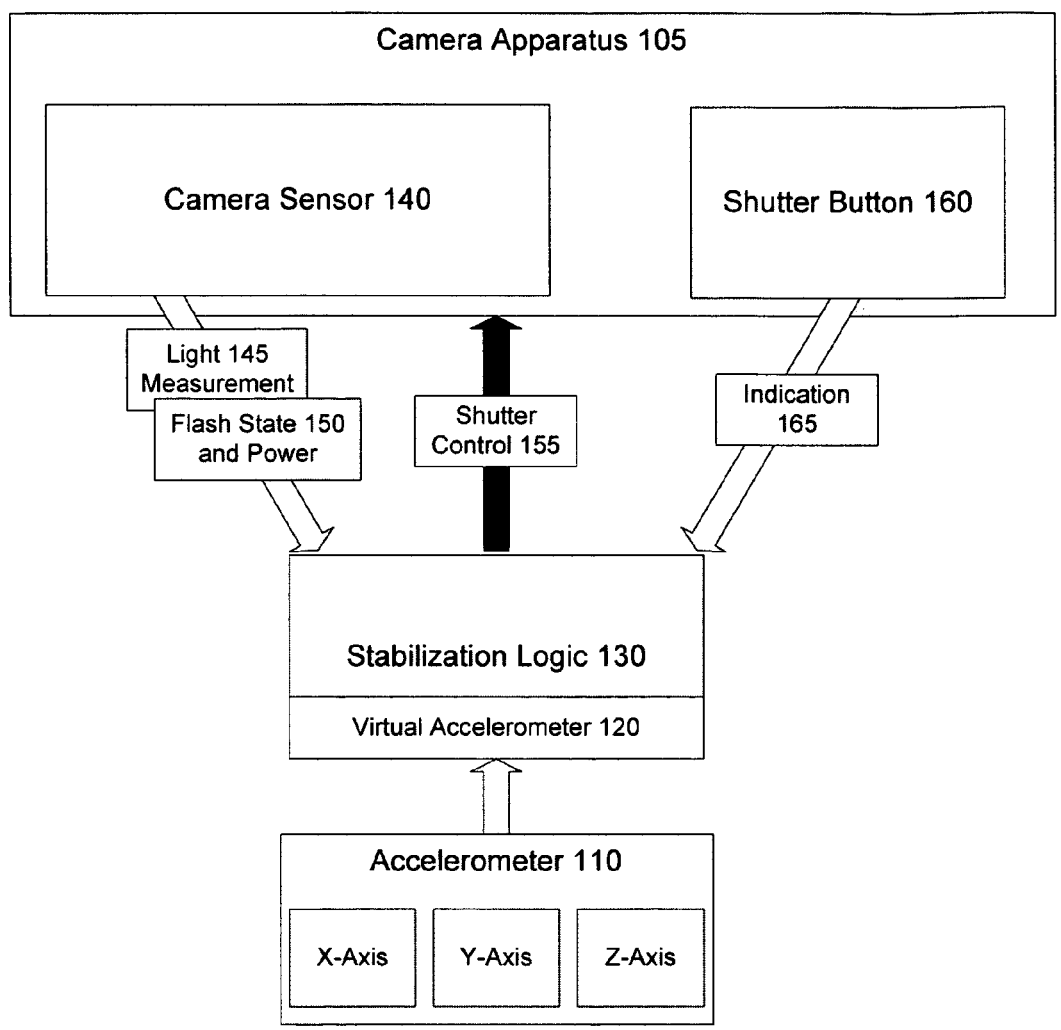
FIG. 1 is a system diagram of one embodiment of a camera system which may be used with the present invention.

FIG. 1 is a system diagram of one embodiment of a camera system which may be used with the present invention. The camera apparatus 105 includes a camera sensor 140 and a shutter release button 160. In one embodiment, the camera apparatus 105 may be any existing camera apparatus, and does not require hardware modification.

Camera sensor 140 in one embodiment is used to detect light levels and power levels for the flash. This data, in one embodiment, is communicated as light measurement 150 and flash and power state 150 to the stabilization logic 130. The flash state indicates whether the flash is on or off, and the flash power indicates how much power is available to the flash to illuminate the image. Generally, cameras integrated into other devices such as camera phones or pen cameras have low powered flashes. This means that in low light conditions, the exposure is longer (i.e. the shutter is open for a longer time.) When the shutter is open for longer, ensuring that there is no motion during the entire exposure is even more important.

In one embodiment, the shutter release button's indication 165 is also communicated to the stabilization logic 130. The stabilization logic provides a level of indirection between the user physically pushing the shutter button and the shutter release control signal 155 sent to the camera sensor 140 to trigger the taking of an actual picture.

The stabilization logic 130 is coupled to an accelerometer 110, or alternative motion detection system. In one embodiment, the accelerometer 110 is a three dimensional accelerometer, which measures motion along the X, Y, and Z axes. In another embodiment, a two dimensional accelerometer may be used as acceleration along the Z-axis (towards and away from the object) is often negligible compared to the overall distance, and can be compensated for by the focus length. In another embodiment, two two-dimensional accelerometers may be used.

In one embodiment, the accelerometer 110 is not directly coupled to the stabilization logic 130. Rather, the stabilization logic 130 is coupled to a virtual accelerometer 120. The virtual accelerometer 120 is used in circumstances where more than one application may utilize accelerometer data. For example, in a system which includes motion controls, the accelerometer data may be used by the motion controller as well as the stabilization logic 130. For another example, the accelerometer data may be used to provide step information—i.e. pedometer data. In one embodiment, the accelerometer 110 may be coupled to the device including the camera. For example, the accelerometer 110 may be on a PCMCIA card, or other insertible device which is capable of communicating with the camera logics.

In one embodiment, the stabilization logic 130 receives all accelerometer data when it is activated. Thus, the virtual accelerometer 120 output to the stabilization logic 130 reflects all of the actual accelerometer 110 data. In one embodiment, the stabilization logic 130 is only activated when the camera application is active. In a standard camera this may be when the camera is on. In a multi-function device such as a camera phone, this may be when the camera application is active.

Figure 2:
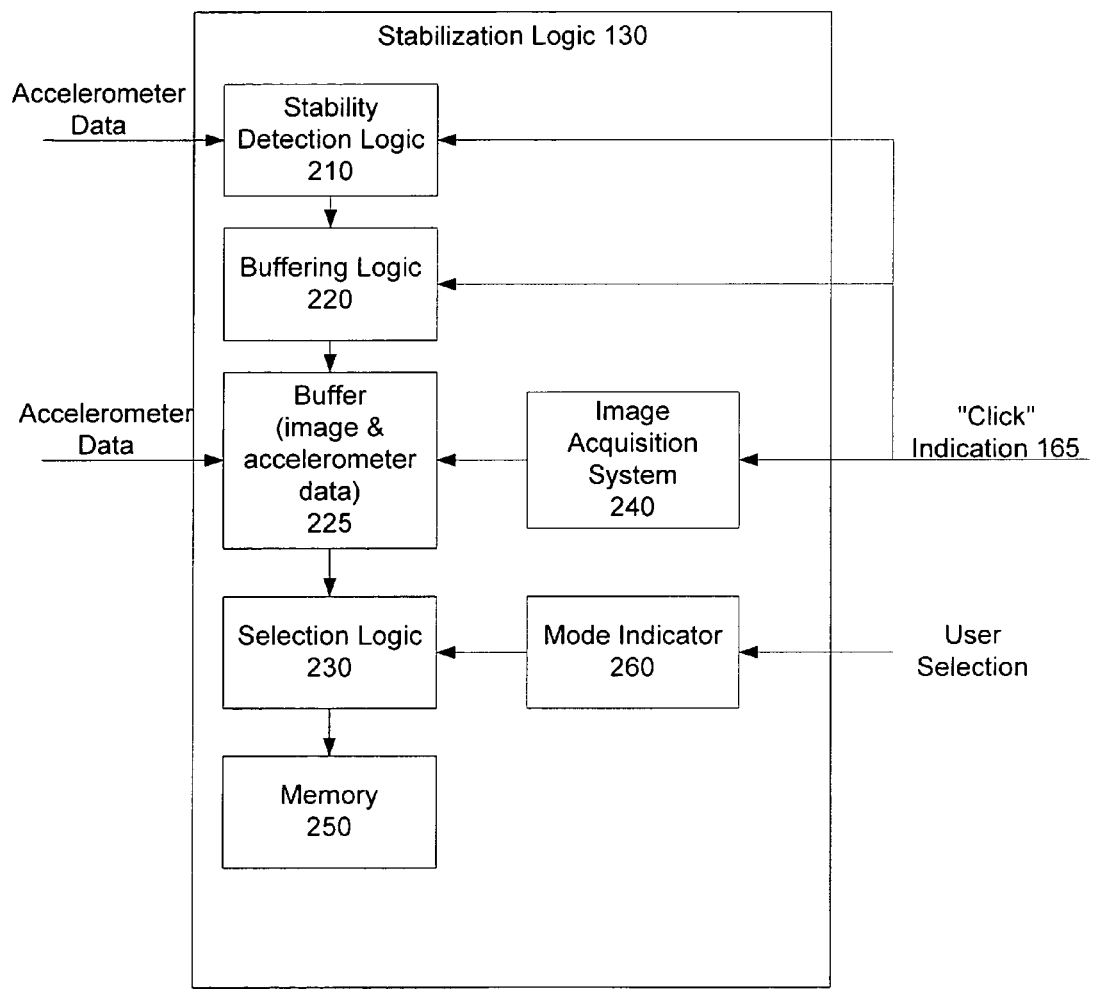
FIG. 2 is a block diagram of one embodiment of the stabilization logic.

FIG. 2 is a block diagram of one embodiment of the stabilization logic. The system receives as its input accelerometer data. As noted above, this data may be received directly, via a virtual accelerometer, or from an external device.

Stability detection logic 210 is designed to calculate an overall relevant motion of the device. The accelerometer data, for example, may show motions toward and away from the image target. However, if the focus is far away compared to the motions,—for example, focus is on a mountain far away—this motion may be discounted, or removed from the overall motion calculated by stability detection logic. In one embodiment, the goal of stability detection logic 210 is to identify a point when the camera is not moving. However, accelerometers only detect acceleration, not velocity. In one embodiment, stability detection logic 210 determines whether the accelerations are static or tending towards static. In one embodiment, tending towards static means that the current acceleration on each axis is close to zero or is zero. In one embodiment, tending towards static means that the acceleration average for each axis is close to zero or is zero. In one embodiment, the stability detection logic 210 also checks if the jerk or change in acceleration is getting smaller or is small, so tending towards steady state. Generally speaking, this does not handle constant velocity. However, constant velocity is very rare in human motion.

In one embodiment, once stability detection logic 210 detects that the camera is stable, it triggers buffering logic 220 to take sequential images and store them in buffer 225. The buffer 225 stores the images and the associated accelerometer data. In one embodiment, the accelerometer data is attached to the images as metadata. Thus, when an image is later evaluated, or corrected through other means, the accelerometer data is available. In one embodiment, depending on the time it takes to completely record the image, multiple accelerometer readings may be taken. Thus, the accelerometer data may include multiple readings from the accelerometer. In one embodiment, once the indicator signal is received by buffering logic 220 a preset number of additional images are taken.

Selection logic 230 takes the images from buffer 225 and selects the best image. The best image, ideally, is near the timing of the indicator and has no or minimal motion, which has no impact on the quality of the image. Thus, each frame taken has a quality rating which is, in one embodiment, a function of proximity to the indicator and motion data. In one embodiment, a lighting rating is also included as a parameter in the quality function.

In one embodiment, the system further includes a "mode indicator" 260. The mode indicator 260 enables the user to select "still image" or "action image" mode for the picture. In one embodiment, this mode indication is used by the selection logic 230, to determine the relative weight of the proximity to the indicator. For still images, stability is more important than proximity to the indicator (since still images generally do not change rapidly). Still images include images of scenery, portraits, images of nature, etc. For action images, the proximity of the frame to the indicator is important, since the scene is likely to be changing rapidly. Action images include images of people performing in sports activities, animals in motion, thunder storms, and other rapidly changing scenes.

The selection is then stored in memory 250. In an alternative embodiment, the selection logic 230 enables a user to make a selection from among the buffered images.

In another embodiment, instead of the stability detection logic triggering the taking of pictures, the indicator triggers image acquisition system 240. The system then takes a series of images, and stores them in the buffer 225, along with the accelerometer data.

In another embodiment, stability detection logic 210 receives the indication, and waits until the camera is stable before taking a single image, and storing it in memory 250.

Thus, in one embodiment, not all of these elements are present in any single implementation of the system. One implementation may simply include stability detection logic 210 which receives accelerometer data and indicator data, and memory 250.

Another implementation may include stability detection logic 210, buffering logic 220, buffer 225, selection logic 230, and memory 250. While yet another implementation may include image acquisition system 240, buffer 225, selection logic 230, and memory 250. Yet another implementation may include all of these elements, and enable the user to select between the various possible configurations. Thus, the user may activate a subset of these elements, based on the user's preferred method of providing better quality images.

Figure 3:
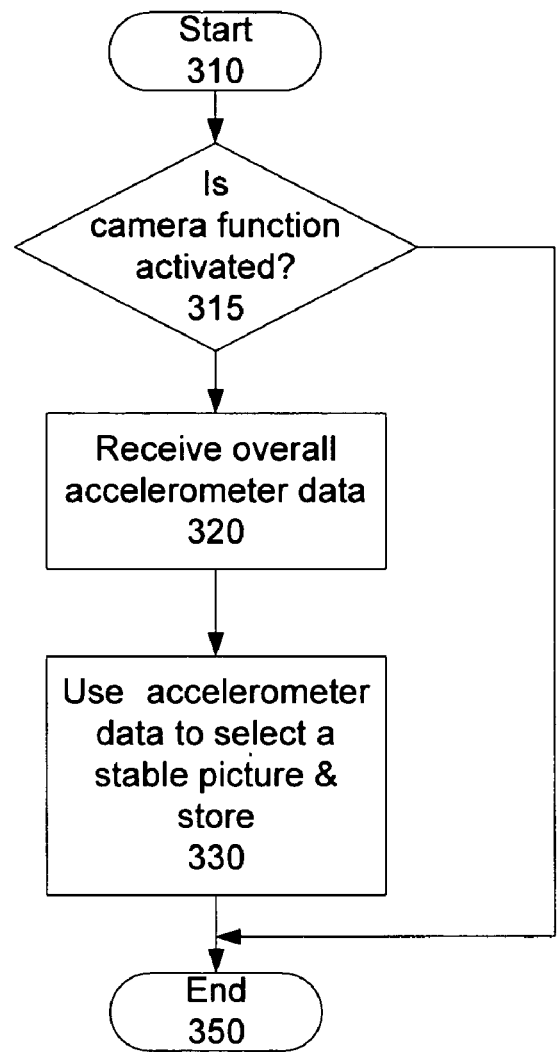
FIG. 3 is an overview flowchart of one embodiment of using the stabilization logic.

FIG. 3 is an overview flowchart of one embodiment of using the stabilization logic. The process starts at block 310. At block 315, the process determines whether the camera function has been activated. If the camera function is not active, the process ends at block 350. In one embodiment, the process only starts when the camera function is activated. Note that in a stand-alone camera, this occurs when the camera is turned on. In other applications, the user may manually or otherwise select the camera functionality.

At block 320, the overall accelerometer data is received.

At block 330, the process utilizes the accelerometer data to select an image, and store it. In one embodiment, accelerometer data associated with the instant an image is taken is stored along with the image. In one embodiment, the accelerometer data may become part of the metadata associated with the image. In one embodiment, the system continues to store accelerometer data while the image is being taken, thus multiple accelerometer readings may be part of the accelerometer data. The accelerometer data may be used to time taking a singular image, or to select an optimum one of a plurality of images. In one embodiment, the accelerometer data (which may include multiple accelerometer readings) is stored as metadata associated with the selected image. The process then ends at block 350.

Figure 4:
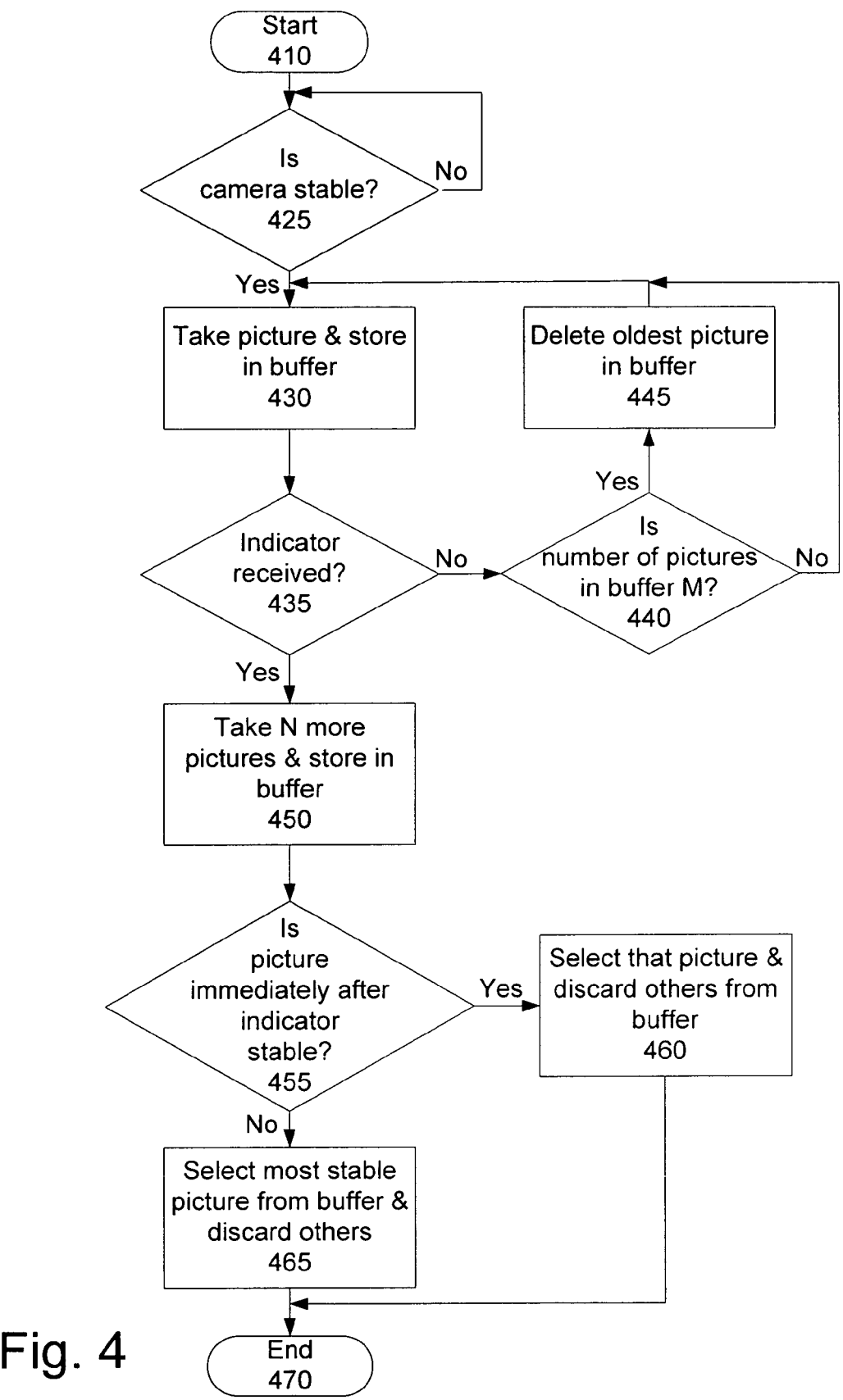
FIG. 4 is a more detailed flowchart of using one embodiment of the stabilization logic.

FIG. 4 is a more detailed flowchart of using one embodiment of the stabilization logic. The process starts at block 410. In one embodiment, FIG. 4 corresponds to block 330 of FIG. 3.

At block 425, the process determines whether the camera is being held stably. In general, when users are preparing to take a picture, they frame the picture, and start holding the camera steady. Block 425 is tested until the camera becomes stable. As noted above, in one embodiment this is indicated by the accelerations being static or tending towards static. In one embodiment, if the camera is not stable when the indicator is received (i.e. the user snaps a picture) the picture is taken in the conventional way.

Once steadiness is detected, at block 430 a picture is taken, and stored in a buffer. While the picture is being taken, the accelerometer readings are being stored as well. In one embodiment, the accelerometer readings are stored as a single batched accelerometer metadata. In one embodiment, the accelerometer data is attached to the sub-portion of the image data which is it associated with. That is, for example, each line of an image may have an accelerometer reading associated with it. This may enable post-processing to correct for image blur based on the accelerometer data, within the image itself. For example, at a very simple level, if one line of the image was scanned while the camera was moving to the right, the image line may be corrected by moving the line to the left, to correct.

The process then tests whether the indicator has been received. If no indicator has been received—i.e. the user has not clicked to take a picture—the process continues to block 440.

At block 440, the process determines if the number of pictures in the buffer is larger than a preset maximum number, M. In one embodiment, this maximum may be set by the user. In another embodiment, the maximum may be based on a buffer size. In one embodiment, the maximum may be based on an available RAM memory in the camera system. In one embodiment, the system may instead determine whether the total size of the images has reached a maximum size. Thus, in one embodiment, if the user is taking smaller pictures, more images may be buffered. In one embodiment, the maximum number M is set to two.

If the number of images in the buffer has not reached M, the process continues to block 430 to take a next picture. If the number of images has reached M, the process continues to block 445. At block 445, the oldest picture in the buffer is deleted. The process then continues to block 430 to take a next picture.

This system is designed to take multiple pictures in a sub-second timeframe. In one embodiment, the value of M is set such that the next picture can be taken while the oldest picture in the buffer is being deleted (i.e. that the two actions can be performed in parallel), to ensure that the deletion does not slow down the process. In one embodiment, the buffer is a ring buffer, so that older data is overwritten as newer data is added.

If, at block 435, an indicator was detected, the process continues to block 450.

At block 450, N more pictures are taken and stored in the buffer. In one embodiment, N is set by the user. In one embodiment, the default value for N is 3. In one embodiment, the values of M and N are chosen to ensure that N+M pictures can be stored in the buffer without difficulty.

At this point, the picture-taking aspect of the process is complete. There are now N+M (or fewer) pictures in the buffer. Note that each of the pictures has associated accelerometer data, which as noted above may include multiple accelerometer readings.

At block 455, the process determines whether the picture taken closest to the time when the shutter release was clicked by the user is stable. In one embodiment, this image may have been actually stored in the buffer due to the stability, just before the indicator, as the indicator was received, or shortly thereafter. If so, at block 460 it is selected, since it is likely to be showing the image the user wished to preserve. The remaining images are discarded from the buffer. In another embodiment, the user may be presented with all of the images, and permitted to select from them. In another embodiment, a subset of the images may be selected, and the presented to the user. The process then ends at block 470.

If the picture immediately after the indicator, or immediately at the indicator, was not stable or does not exist, the process continues to block 465. At block 465, the best picture is selected from the buffer, and the rest are discarded. In one embodiment, the best picture is the most stable picture. In another embodiment, the best picture is calculated based on a combination of stability, image artifacts, and proximity to the receipt of the indicator. In another embodiment, other quality indicators such as lighting may be included to evaluate the quality of the image.

The selection of the best image may be based on a scoring system. At its simplest, each image is scored using a sequential set of unique scores. For example, for five images, each image is assigned a score from 1 to 5, with 5 being best, i.e. least motion/closest to the indicator. The image with the highest total score is then selected. Alternative mechanisms of scoring may be used. In one embodiment, the picture mode (action v. still) is also utilized in this calculation. In one embodiment, for action shots, the scoring emphasizes proximity to the indicator, while for still images, the scoring focuses on motion. As noted above, in another embodiment, two or more images may be presented to the user and the user may be able to select the preferred image. The process then ends at block 470.

In one embodiment, prior to the scoring the evaluation first discards all images having a level of motion above a threshold. Then, all images which do not have any in-focus portions, indicating artifacts from motion, are discarded. The remaining images are evaluated as described above.

In one embodiment, blocks 455 and 460 may be skipped. In one embodiment, instead, the scoring method is used, and the image immediately proximate to the indicator is given an additional point.

Figure 5:
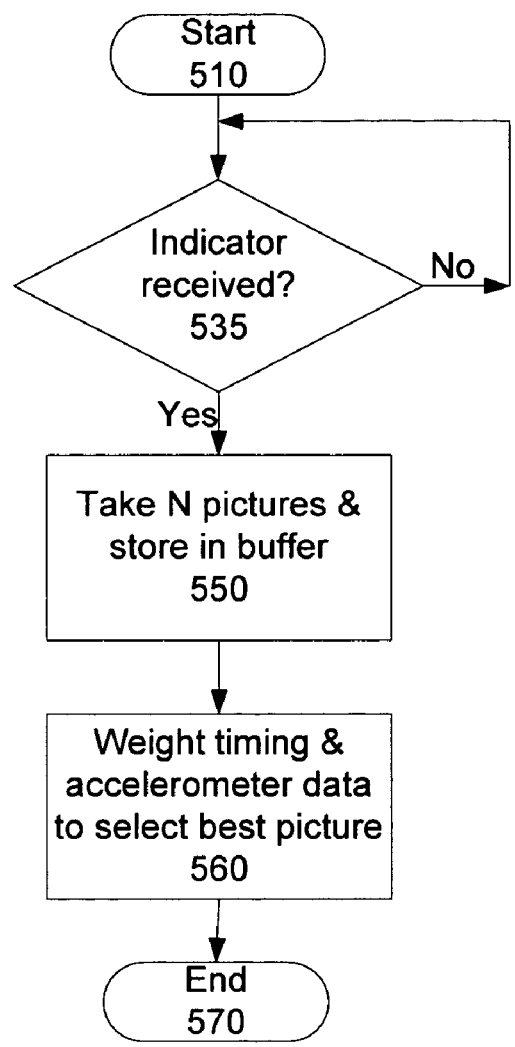
FIG. 5 is a more detailed flowchart of using another embodiment of the stabilization logic.

FIG. 5 is a more detailed flowchart of using another embodiment of the stabilization logic. The process of FIG. 5 is similar to that described in FIG. 4. However, instead of starting to buffer images upon receiving a stable signal, the image buffering is initiated in response to receiving the indicator, as shown in block 535.

Then, N pictures are taken in rapid sequence. In one embodiment, the pictures are taken as fast as the camera and buffer can handle.

The system then evaluates the timing (proximity to indicator) and motion (accelerometer data) to select the best picture, at block 560. The various techniques described above with respect to FIG. 4 may be used. Alternative methods of evaluating the best picture, including simply selecting the picture with the least motion, may be utilized. The process then ends at block 570.

Figure 6:
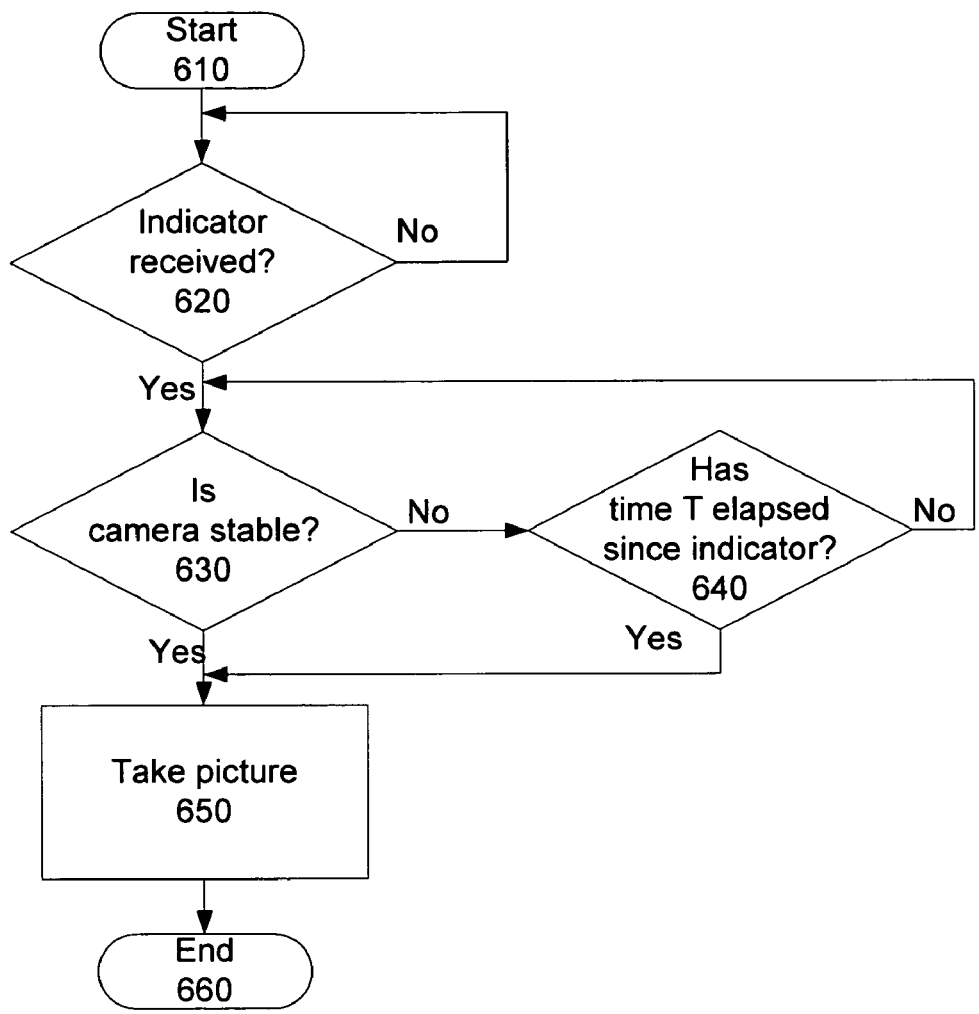
FIG. 6 is a more detailed flowchart of using another embodiment of the stabilization logic.

FIG. 6 is a more detailed flowchart of using another embodiment of the stabilization logic. The process starts when the camera application is activated. The process monitors to see whether the indicator is received, at block 620.

When the indicator is received, the process continues to block 630. At block 630, the process determines whether the camera is stable. This is determined based on the motion data. In one embodiment, the motion data may be accelerometer data.

If the camera is stable, a picture is taken at block 650. The process then ends.

If the camera is not stable, the process at block 640 determines whether time T has elapsed. Time T, in one embodiment, is the maximum delay permitted by the system. In one embodiment, time T is set to be less than 2 seconds. In one embodiment, time T is adjustable by the user. In one embodiment, time T is set to be less than the maximum shutter delay projected for the system. If time T has not yet elapsed, the process returns to block 630 to attempt to take an image when the camera is stable. If time T has elapsed, the process continues to block 650, to take a picture. The process then ends.

This process simply attempts to time the taking of the picture until the camera is properly stable. In general, motion may be caused by clicking. Thus, even a minimal delay of a tenth of a second may be sufficient to produce a much better quality image.

Figure 7:
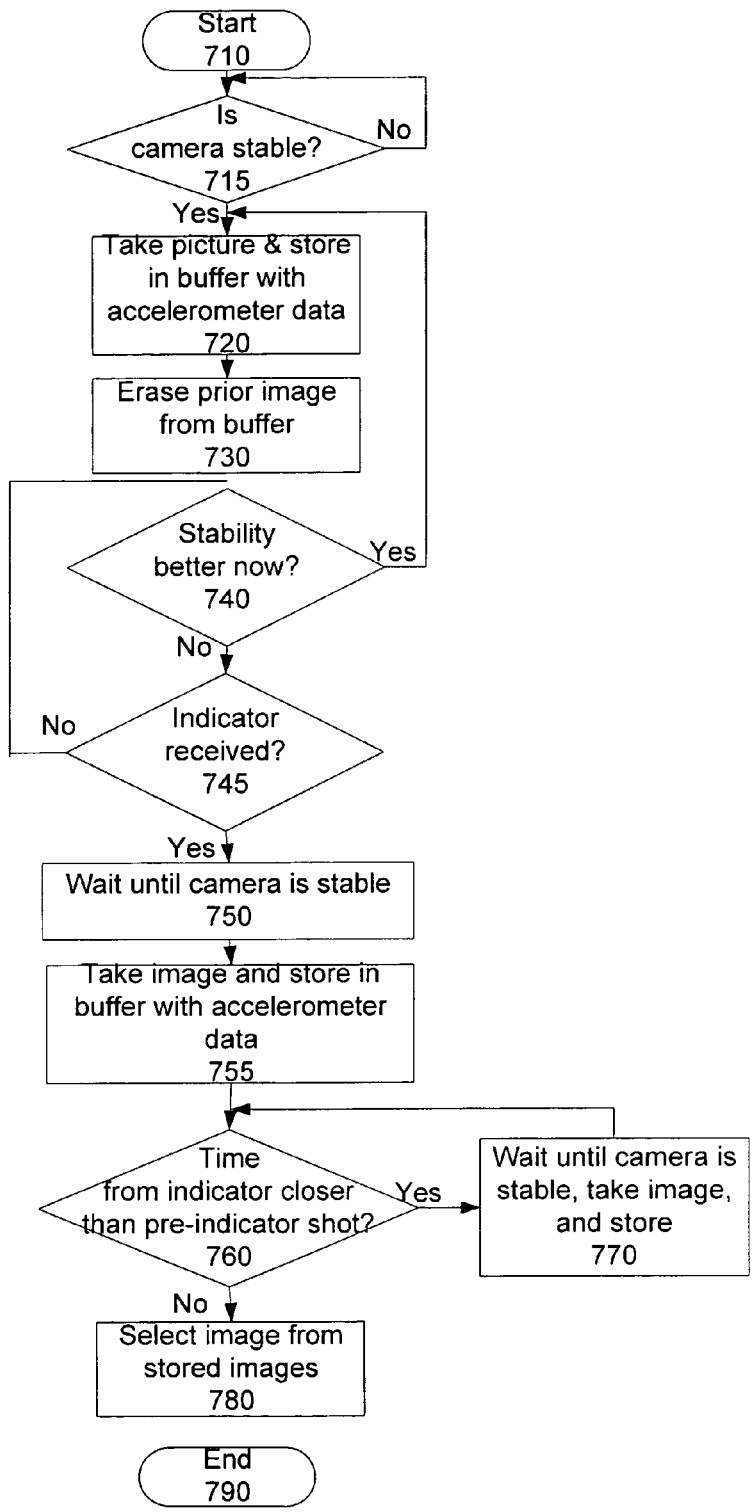
FIG. 7 is a flowchart of using another embodiment of the stabilization logic.

FIG. 7 is a flowchart of one embodiment of the process. The process is similar to that described above with respect to FIG. 4. However, the process of storing images is different. At block 715, the process waits until the camera is stable. At block 720, the image is taken, and the image and its accelerometer data are stored in a buffer. At block 730, the prior image in the buffer, if any, is erased. In one embodiment, "erased" can simply mean overwritten. In one embodiment, "erased" can simply mean that the write pointer is directed at the prior image, such that the next image stored in the buffer will overwrite the prior image.

At block 740, the process determines whether the stability of the camera is better than the stability associated with the prior stored image. If so, the process returns to block 720, to take an image.

If the stability is not better than the stability of the prior image, the process continues to block 745. At block 745, the process determines whether the shutter release signal has been received. If not, the process returns to block 740, to continue evaluating the stability of the camera, compared to the stability associated with the already stored image.

If the shutter release signal has been received, the process continues to block 750. At block 750, the process waits until the camera is stable. At block 755, the image is taken, and the image and its accelerometer data are stored in a buffer.

At block 760, the process determines whether the current time from shutter release is closer than the time associated with the stored image. That is, the process determines whether it is possible to take a new image that is closer in time to the shutter release than the already stored pre-shutter release image. If not, the process continues to block 780. Otherwise, the process continues to block 770.

At block 770, the process evaluates the stability of the camera. If the camera is stable, then another image is taken. In one embodiment, this image is stored in the same buffer as the images taken prior to the shutter release. Therefore, the 2nd prior image is replaced. The process continues to block 760, to determine the current time from shutter release.

At block 780, the images are evaluated, and the best image is selected. The image evaluation may take into account the stability of each image (i.e. the accelerometer readings, and the integral of the accelerometer reading, or second integral of accelerometer), and the proximity of each image to the time of the shutter release. In one embodiment, the remaining images are deleted.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An improved camera system including:
   a camera apparatus including an aperture and an image sensor, the camera apparatus to take a plurality of images;
   an accelerometer to detect motion of the improved camera system and to generate accelerometer data based on the detected motion;
   a buffering logic to buffer the plurality of images and to buffer the acceleration data, wherein each of the plurality of images is associated with distinct accelerometer data; and
   a stabilization logic to utilize the accelerometer data to select an image having a minimal motion from the plurality of images, when a user provides an indication,
   the stabilization logic including a selection logic to discard each of the plurality of images having acceleration data that indicates a level of motion above a motion threshold and each of the plurality of images that do not have any in-focus portions, and
   the selection logic further to select a function to use to evaluate a quality value of each of a remainder of the plurality of images, and to select an image from the remainder of the plurality of images that has a largest quality value, the quality value being a function of stability and time from the indication.

2. The system of claim 1, wherein the stabilization logic comprises:
   the buffering logic to buffer at least one of the plurality of images prior to the indication.

3. The system of claim 1, further comprising:
   the selection logic to first determine whether the camera is in a still image mode or an action image mode, and select a first function that weights the time from the indication more heavily for the action image mode and a second function that weights the stability more heavily for the still image mode.

4. The system of claim 1, wherein the image quality value is further a function of lighting level.

5. The system of claim 2, further comprising a stability detection logic to detect a user stabilizing the system for taking an image, the stability detection logic to trigger the buffering logic to take the image taken prior to the indication.

6. The system of claim 1, wherein the stabilization logic comprises:
   an image acquisition system to cause the camera apparatus to take the plurality of images upon receipt of the indication; and
   the selection logic to select an image from the plurality of images, based on a reading from the accelerometer indicating that the selected image is a most stable image.

7. The system of claim 1, wherein the stabilization logic comprises:
   a stability detection logic to utilize data from the accelerometer to detect an optimal stability after receiving the indication, within a period of time, the stability detection logic to trigger taking the image.

8. A system comprising:
   a camera including a shutter indicator and a camera sensor, the camera to take a plurality of images;
   an accelerometer to detect motion of the system and to generate accelerometer data based on the detected motion; and
   a stabilization logic to utilize the accelerometer data to select an image having a best image quality from the plurality of images when a user provides an indication, the stabilization logic comprising:
      a stability detection logic to determine a level of stability for each of the plurality of images based on the accelerometer data;
      a buffering logic to buffer the plurality of images and to buffer the accelerometer data, wherein each of the plurality of images is associated with an image quality value, the image quality value being a function of the level of stability of the camera and a time from the indication; and a selection logic to discard each of the plurality of images that fail to satisfy one or more image quality criteria, and to select the image having the best image quality from a remainder of the plurality of images, using one of a first image selection function that weights the time from the indication more heavily and a second image selection function that weights the level of stability more heavily.

9. A stabilization logic, to be used with a camera, comprising:

a stability detection logic to detect whether the camera is tending toward stability and whether the camera is stable, wherein the camera is tending toward stability if an acceleration of the camera is getting smaller and a rate of change of the acceleration is getting smaller, and wherein the camera is stable when the acceleration is approximately zero and the rate of change of acceleration is approximately zero;

an image acquisition system to enable the camera to acquire a plurality of images and a plurality of motion sensor readings when the stability detection logic detects that the camera is stable, wherein each of the plurality of images is associated with one or more of the plurality of motion sensor readings; and a selection logic to discard each of the plurality of images associated with motion sensor readings that indicate a level of motion above a motion threshold, to further discard each of the plurality of images that do not have any in-focus portions, and to enable selection of one of a remainder of the plurality of images acquired, the selection logic selecting based on a quality of the image, wherein the quality of the image is based, at least in part, on the one or more motion sensor readings associated with the image.

10. The stabilization logic of claim 9, wherein the image acquisition system acquires an image after the shutter release signal is received from the user.

11. The stabilization logic of claim 9, wherein the quality of the image is a function of a stability of the image and proximity to a shutter release indicator.

12. The stabilization logic of claim 11, wherein the quality of the image increases with increased stability and increases with decreased distance from a time at which the shutter release indicator is received.

13. The system of claim 8, wherein the image quality value for at least two of the plurality of images satisfy an image stability criteria.

14. The stabilization logic of claim 9, further comprising:
the image acquisition system to buffer the plurality of images in a buffer, wherein at least one of the plurality of images is buffered prior to a shutter release signal and at least one of the plurality of images is buffered after the shutter release signal.

15. The stabilization logic of claim 14, wherein the stability detection logic to detect a user stabilizing the camera for taking an image, the stability detection logic to trigger the image acquisition system to begin buffering the plurality of images prior to the shutter release signal.

16. The stabilization logic of claim 11, wherein the image quality value increases with increased stability and increases with decreased time from the shutter release indication.

17. The system of claim 1, wherein the acceleration data is attached to the plurality of images as metadata.

18. The system of claim 1, wherein at least two of the plurality of buffered images satisfy a stability criteria.

19. The system of claim 8, further comprising:
the selection logic to determine whether the camera is in a still image mode or an action image mode, to use the first image selection function when the camera is in the action image mode and to use the second image selection function when the camera is in the still image mode.

20. The system of claim 8, wherein the image quality criteria include a first image quality criterion and a second image quality criterion, wherein an image fails to satisfy the first image quality criterion when the image has accelerometer data that indicates a level of motion above a motion threshold, and wherein the image fails to satisfy the second image quality criterion when the image does not have any in-focus portions.

* * * * *